United States Patent [19]

Forkner

[11] 3,860,731

[45] Jan. 14, 1975

[54] COCOANUT FOOD PRODUCT AND METHOD

[75] Inventor: John H. Forkner, Fresno, Calif.

[73] Assignee: The Pillsbury Company, Minneapolis, Minn.

[22] Filed: Feb. 26, 1973

[21] Appl. No.: 335,834

Related U.S. Application Data

[63] Continuation-in-part of Ser. No. 240,191, March 31, 1972, abandoned.

[52] U.S. Cl.................. 426/199, 426/207, 426/213, 426/327, 426/373, 426/378, 426/459
[51] Int. Cl............................ A23l 1/36, A23b 7/08
[58] Field of Search ........... 426/199, 205, 207, 378, 426/213, 378

[56] References Cited
UNITED STATES PATENTS 3,573,064  3/1971  Noznick .............................. 426/205

FOREIGN PATENTS OR APPLICATIONS

557,966  5/1958  Canada .............................. 426/207

Primary Examiner—Samih N. Zaharna
Assistant Examiner—J. M. Hunter
Attorney, Agent, or Firm—Fleur, Hohbach, Test, Albritton and Herbert

[57] ABSTRACT

A process for treating coconut meat which involves acid treatment of coconut pieces to effect some cell disruption and reorientation, thereby tenderizing and increasing absorptivity of the coconut. Thereafter the pieces may be used as is or dried with or without further processing. Further processing includes impregnating the moist pieces before drying with various materials, such pieces after drying may be crunchy and have characteristics comparable to natural nuts.

26 Claims, 3 Drawing Figures

COCOANUT FOOD PRODUCT AND METHOD

REFERENCE TO RELATED APPLICATIONS

Reference is made to co-pending 1974, Ser. No. 452,740, filed Mar. 20, 1074, a continuation of Ser. No. 240,191 filed Mar. 31, 1972, now abandoned, of which this application is a continuation in part. Also reference is made to copending application Ser. No. 173,106, filed Aug. 19, 1971, which is a continuation in part of applications Ser. Nos. 866,452, filed Oct. 15, 1969, now abandoned, and 74,310, filed Sept. 22, 1970, now abandoned, and copending application Ser. No. 335,688, filed Feb. 26, 1973.

BACKGROUND OF THE INVENTION

This invention relates generally to the processing of coconut meat and to edible products resulting from the same.

Coconut meat as used in the food industry has been subject to a number of disadvantages. Particularly it has a cell structure such that it is tough, whether in the form of fresh meat, dried or desiccated coconut, treated with sugar or sugar syrup or incorporated in other products. When conventional desiccated coconut strings are incorporated in cake or cooky dough or batter mixes, they are not cut when the mix is employed in a wire cut depositor. Also desiccated coconut incorporated in such products is relatively impalatable unless confined to a narrow range of thickness. In some instances fresh coconut meat has been cut into pieces such as ribbons, flakes or dices, with or without sugar impregnation and drying, to provide a product which can be eaten out-of-hand or used as a topping for cakes and cookies. Such product is likewise relatively tough and is lacking in palatability when the pieces are of substantial thickness (e.g., thicker than ⅛ inch). Such a product does not have the crunchy or other nut-like characteristics of natural nut meat.

In general there is a need for coconut meat of edible quality which has extended usefullness in the food industry, including use in bakery, confection or dessert products, as well as to provide products which can be eaten out-of-hand.

SUMMARY OF THE INVENTION

In general, it is an object of the invention to provide a process for the treatment of coconut pieces which will produce products in piece form which are tenderized and usable for a variety of purposes. Products produced by the process are suitable for general food usage, and for out-of-hand eating, although the thickness of the pieces may be substantially greater than conventional desiccated coconut forms.

Another object is to provide a coconut treatment process which produces desirable characteristics in the final product by impregnating the pieces with other food materials.

Another object is to provide a coconut treatment process which produces dry pieces of coconut meat that are crunchy and which have many of the desirable characteristics of natural nut meat.

Another object is to provide novel products resulting from the method, including tenderized pieces of coconut in moist condition, such pieces after drying, and dried coconut pieces which contain texturizing materials to provide desirable characteristics.

In general the present process treats pieces of coconut in an acid solution to effect some tenderizing of the meat by modification of the cellulosic cell structure, after which it is desirable to neutralize free acid. The resulting moist, tender coconut pieces can be used (e.g., in the bakery and canning industries) without further processing, or they may be preserved by freezing or dried by conventional means and used as a dry product. Preferably after freezing or drying the moist pieces are subjected to further processing, including impregnation with a texturizing material. In some instances further processing may be carried out before freezing or drying. The characteristics of the final product produced depend upon the character of the texturizing material, and may for example have characteristics comparable to natural nut meat.

Additional objects and features of the invention will appear from the following description in which preferred embodiments have been disclosed in conjunction with the accompanying drawings.

DESCRIPTION OF THE PREFERRED EMBODIMENT

The source material preferably employed in the present process is fresh coconut meat. The fresh meat is freed of all husk and skin material and is diced or cut into pieces of the size desired. In general these pieces are of a size and shape comparable to the size and shape desired in the final product. By way of example the pieces may have a minimum thickness ranging from about one-quarter to one-half inch. As will be presently explained, some of the softer nut meat may be removed before dicing.

Figure 1:
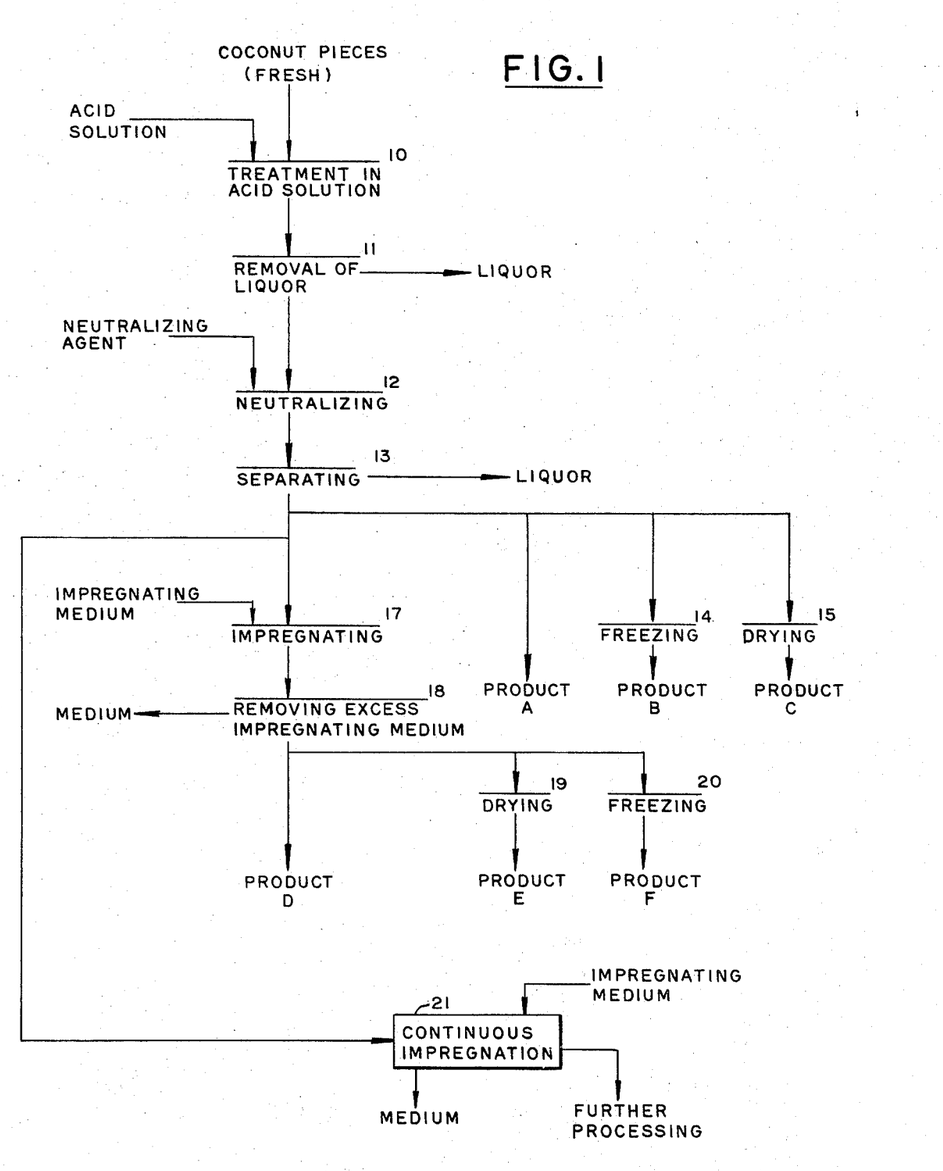
FIG. 1 is a flow diagram illustrating one procedure for carrying out the present process.

In step 10 the coconut pieces are immersed in acid solution at an elevated temperature (e.g., 212°F.) as described in said co-pending application Ser. No. 240,191. It has been found satisfactory to use solutions of inorganic acids like hydrochloric, sulfuric or phosphoric. The hydrogen ion concentration of the solution may range from about pH 2.0 to 0.57. When hydrochloric acid solution is used, which is preferred, the acid concentration may range from about 0.5 to 2.0 percent.

Although the use of inorganic mineral acid is preferred, the process has been carried out with use of edible organic acids, such as lactic and fumaric. Thus the coconut meat has been tenderized by the use of a 15 percent lactic acid solution at pH 1.5, at a pressure above atmospheric of 15 p.s.i.g., and at a temperature of about 250°F., with a treatment period of 25 minutes. Also a weaker acid solution has been used, namely a 5 percent solution of lactic acid (pH 2.0), at the same pressure above atmospheric and temperature, with a treatment period of 35 minutes. A 2 percent solution of fumaric acid (pH 2.0) has also been used under the same pressure and temperature conditions, over a treatment period of 20 minutes.

The time period of treatment in step 10 depends upon a number of factors, including the size of the pieces, the pH and temperature of the solution, the character of the source material and the extent of tenderizing action desired. In general the treatment is terminated before any substantial physical disintegration of the pieces has occurred. The more mature the coconut meat, the less is the time required. As the pH of the solution is lowered, a shorter period of time is required for the same tenderizing effect. The time required also decreases with an increase in treatment temperature. In addition, as the minimum thickness of the pieces is increased, more time is required for effective tenderizing. By way of example, when the coconut meat is in the form of dices about one-quarter inch thick, and step 10 is carried out with a 1 percent hydrochloric acid solution at about 212°F., the treatment time may be of the order of 15 to 20 minutes.

While it is preferable to carry out step 10 at boiling temperature, it is possible to process within a temperature range of about 150° to 212°F. Higher temperatures up to 235°F. can be used if this step is carried out at a pressure greater than atmospheric. As previously stated, the time required for the desired tenderizing effect is reduced as the treatment temperature is increased. In any event care should be taken to avoid extending the treatment to the point of causing substantial disintegration of the meat.

Following the acid treatment in step 10, it is desirable to remove some free liquid from the moist pieces in step 11. This can be carried out by draining, decanting, or by use of such equipment as a basket centrifuge. The liquor removed in step 11 may be processed in various ways to produce one or more by-products. For example, it can be neutralized, concentrated and dried, with or without additives. Also it can be centrifuged to remove some of the fat content. Such liquor can also be recycled and reused in the process. For example after removal of fat and other solids it can be used in the make up of acid solution for the treatment of suceeding batches. Also as presently explained the liquor can be processed and utilized in subsequent steps.

Step 10 not only serves to tenderize the pieces by modifying the cell structure, but in addition certain substances are removed from the meat, namely cementitious substances which appear to be mainly located between the cells and serve in nature to hold the cells together. These substances are hemicelluloses, sugars and proteins and are contained in the liquor removed in step 11. The solids of this liquor also include some of the coconut fat which is released from the meat.

Following step 11 it is desirable to neutralize residual acid of the moist pieces. Thus in step 12 a suitable neutralizing agent is added to the batch, and may be a solution of a suitable alkali, like sodium carbonate or bicarbonate, potassium carbonate or bicarbonate, sodium or potassium hydroxide, or lime. The amount and concentration of the neutralizing solution and the holding or soaking time should be sufficient to neutralize the acid present with the production of a by-product salt that is not objectionable for food products. In the event hydrochloric acid is used in step 10, the use of sodium carbonate or bicarbonate solution in step 12 produces sodium chloride as a by-product, which is not objectionable.

The holding or soaking time that the batch is held after adding the neutralizing solution is preferably such that substantially all of the acid is neutralized. In general the holding time is less for the smaller sizes of coconut pieces (e.g., strings or flakes 0.015 to 0.15 inch thick) and longer for the thicker pieces (e.g., 0.15 to 0.56 inch thick). Thus the time may range from 20 minutes for the smaller sizes to 24 hours for the larger sizes. Insufficient soaking time tends to cause discoloration, presumably due to the action of residual acid. At the end of the soaking period the liquid may have a pH value ranging from pH 4.5 to 6.5 (optimum pH 5.5 to 6.0).

In step 13 the neutralizing solution is removed from the moist pieces, as by draining, decanting, centrifuging and the like. This liquor can be recycled and reused in the process. For example, it can be processed by the removal of fat and solubles and the remaining liquor used to make up neutralizing solution for succeeding batches.

The tenderized moist coconut pieces produced as described above can be used without further processing as Product A, indicated in FIG. 1. However without further processing such moist pieces have a relatively short shelf life. Within this limitation such pieces can be introduced into various bakery doughs and batters, including particularly cake doughs and batters, and are not disintegrated during mixing and baking. After baking the product will remain as moist tender pieces within the dough. Other uses are as a component of soups, in canned products like fruit cocktail where they provide edible pieces and lend stability, and in various desserts. Product B can be made by freezing Product A, as indicated by step 14, to provide a product that can be stored over long periods. Also the moist pieces can be dried in step 15 to produce the preserved dry Product C. Drying can be carried out by conventional methods, including hot air and vacuum drying, to produce dry pieces having a moisture content of the order of from 2 to 6 percent. Such dried pieces when rehydrated, for example upon introducing them into moist dough mixes, produce tender pieces similar to the Product A. While the dry Product C is suitable for various purposes, including its use in confections and in bakery doughs and batters, it is lacking in palatability when eaten out of hand. Some shrinkage occurs during drying, and the resulting pieces are relatively unappetizing in contrast with the crunchy palatable pieces which can be made by further processing, as will be presently described.

For the purpose of producing additional products which have characteristics not possessed by the Products A, B and C, the moist products are shown being subjected to an impregnating step 17. The impregnating medium is in the form of a liquor or syrup, and may be referred to as a texturizing material which serves to modify the texture of the finished product. The extent to which the pieces are impregnated may vary from impregnating only the outer surface layer of the pieces to substantially complete impregnation.

After impregnation, excess impregnating medium may be removed from the pieces in step 18 as by draining and rinsing with hot (e.g., 212°F.) water. This serves to provide Product D, which can be used without further processing. This Product has a moisture content depending upon the procedure used for impregnation. Preferably the Product D is subjected to drying 19 to produce Product E, or freezing 20 to produce the preserved Product F. Products D, E and F can be used for all of the purposes previously mentioned, including use in bakery products, in canning, confections and desserts. In addition, in the dry state they are quite nut-like and agreeable when eaten out-of-hand.

Instead of impregnating by using the batch method, the moist material from step 13 can be supplied continuously to a continuous impregnating step 21. This step can be carried out by the use of suitable apparatus such as is available for this purpose, and which for example may consist of a conveyor to which the moist material is fed, and which carries the moist material through a bath of the impregnating medium. The impregnating medium may be continuously supplied to and removed from the step 21 as indicated, and a controlled amount may be recirculated, with or without processing operations such as reheating, concentration by evaporation and centrifuging to remove such fractions as fat and insolubles. After impregnation excess impregnating medium may be removed by draining the pieces rinsed with hot (e.g., 212°F.) water. Then the pieces may be further processed to produce products like Products E and F.

One type of impregnating medium which has been used with good results is a sugar syrup. I have reference to a syrup made from such materials as sucrose, invert syrup, corn syrup, honey, sorbitol, dextrose and hydrolized cereal solids of low dextrin equivalency (e.g., 10–30 D.E.) or mixtures of the foregoing.

Another type of impregnating medium is one that consists of or contains substantial amounts of a dispersed protein of animal or vegetable origin. Various proteins can be employed including casein, caseinate (e.g., sodium caseinate), albumen, whey protein, soybean protein, and fish protein (refined and deodorized).

A third type of impregnating medium is one which consists of or contains a hard fat, namely a fat having a melting point above about 90°F. The fat may be of animal or vegetable origin and may be partially hydrogenated. A coconut fat may be used, particularly since it avoids adding a non-coconut substance to the product. The fat may be blended with edible waxes (e.g., beeswax) and gums.

In addition to the three general types of impregnating mediums referred to above, various combinations can be used with good results. For example, a sugar-type impregnating medium may be blended with some fat, or it may be blended with some protein. Also it may contain both dispersed protein and a fat. The sugar of the impregnating medium may be caramelized for flavor.

Assuming that the end product is to be used in the confectionary or baking industries, the impregnating medium may be a sugar syrup, without any substantial amounts of protein or fat. Also for this purpose the pieces may be substantially completely impregnated. Also the impregnating medium can be a confection material including sugar and confection flavoring.

When a product suitable for out-of-hand eating is desired, the impregnation (e.g., with sugar syrup) can be limited to the outer surface layers of the pieces, after which the pieces are dried. Also for promoting nut flavor and simulation of nut texture it is desirable for the sugar to consist substantially entirely or in part of hydrolized cereal solids of low dextrin equivalency. The use of such a syrup, namely one consisting entirely or largely of hydrolized cereal solids of low dextrin equivalency (e.g., Morex) serves to impart a crunchy shell to the dry product, with less sweetness than sucrose for a product comparable to natural nut meat for out-of-hand eating. Also such a shell effect serves to minimize shrinkage of the pieces during drying.

Sugar in the impregnating material tends to provide some discernible hardening of the pieces. When impregnation is limited to the outer layers of the pieces, this hardening effect tends to produce a crunchy shell. When dispersed protein is used in the impregnating material, it tends to impart crispness to the pieces and when eaten fibrous material does not tend to collect as compact masses between the teeth. Impregnation by use of a molten hard fat may be used to increase the fat content of the final product to the point of providing a fat content equal to that of the original fresh meat, or a somewhat higher fat content. However, it has been noted that when fat is used alone as an impregnating medium it provides a product which is lacking in crispness. It is considered desirable to use sugar syrup containing fat, with the fat being a minor ingredient. Addition of an edible wax serves to supplement the properties imparted by the fat content. An edible emulsifying agent (e.g., lecithin) may be used to promote dispersion of the fat in the sugar syrup. Best results have been secured when a product suitable for out-of-hand eating is desired by using an impregnating material containing sugar, protein and fat. When impregnation is limited to the outer layers of the pieces, this shell type of impregnating medium provides good eating characteristics with crunchiness and crispness, and with the product having the characteristics of nut meat that is associated with nuts.

Previous reference has been made to the fact that in the acid treatment step 10, some protein is removed from the coconut meat cells. The use of a dispersed protein in the impregnating material serves to replace all or a part of this natural protein, and appears to contribute to eating properties associated with nuts.

It has been explained that when the moist tenderized pieces produced in step 13 are dried without impregnation, substantial shrinkage occurs. By the use of impregnation as described above, shrinkage is substantially reduced during drying. This applies particularly to impregnating mediums of the sugar based type, with or without some protein.

In the foregoing it is assumed that all of the fresh meat of the coconut is used, after removal of shell and skin portions. In general the fresh meat of a mature coconut has a thickness of the order of ⅜ to 9/16 inch. The inner layer of the meat, constituting about 25 percent of the entire coconut meat, is watery and oily and is soft and tender, whereas the outer portion, constituting about 75 percent of the meat, has a more fibrous structure which imparts its characteristic toughness and its nut-like properties when dried. In carrying out the present process it is desirable, but not essential, to remove the relatively soft 25 percent portion forming the inner layer of the coconut meat, after which the outer layer portion is subjected to dicing or otherwise cut into pieces of the desired shape and size. This practice makes for uniformity of the final product. Pieces selected in this manner tend to have less loss in processing and less shrinkage in drying, and enhance the desirable nut-like properties referred to above.

Assuming that the impregnating material consists mainly of a sugar syrup, with or without smaller amounts of protein and/or hard fat, it is desirable to carry out the impregnating step 17 with the material at or about its boiling point, which depending upon the concentration of the medium, may range for example from 215° to 235°F. At these impregnating temperatures and over the period of impregnation, a substantial amount (e.g., 25 percent) of the moisture contained in the moist pieces from step 13, is removed. Thus although the moist pieces from step 13 may have about 60 percent moisture, after the impregnating step 17 the pieces may have a moisture content ranging from about 48 to 53 percent. When impregnation is carried out in batches, introduction of a batch of the moist coconut pieces into the hot syrup will temporarily reduce the temperature of the batch from an initial value of say 220°F. to a lower value of say 180°F. However, if heat is applied continuously the temperature rises again to boiling point.

As indicated above instead of starting with a dilute syrup which is concentrated during impregnation, it is preferable to start with a concentrated syrup at boiling temperature, whereby over the initial impregnating period more moisture is imparted to the syrup than that removed by evaporation. Under such conditions the concentration of the syrup at the end of impregnation is less than at the start. For example, the syrup concentration may initially be 80 Brix, a reduced concentration of 65 Brix after the initial phase of concentration, and a final concentration of 70 Brix at the end of the impregnating step. This technique is particularly desirable where impregnation is limited to the outer surface layers of the pieces, thus providing an exterior shell effect to the pieces of the final product.

If impregnation of the pieces is to be substantially complete then starting with a syrup of say 55 Brix, impregnation under the same conditions may be continued at boiling temperature over a period of the order of 20 to 25 minutes, with the syrup reaching concentrations of the order of 72 to 75 Brix.

Figures 2, 3:
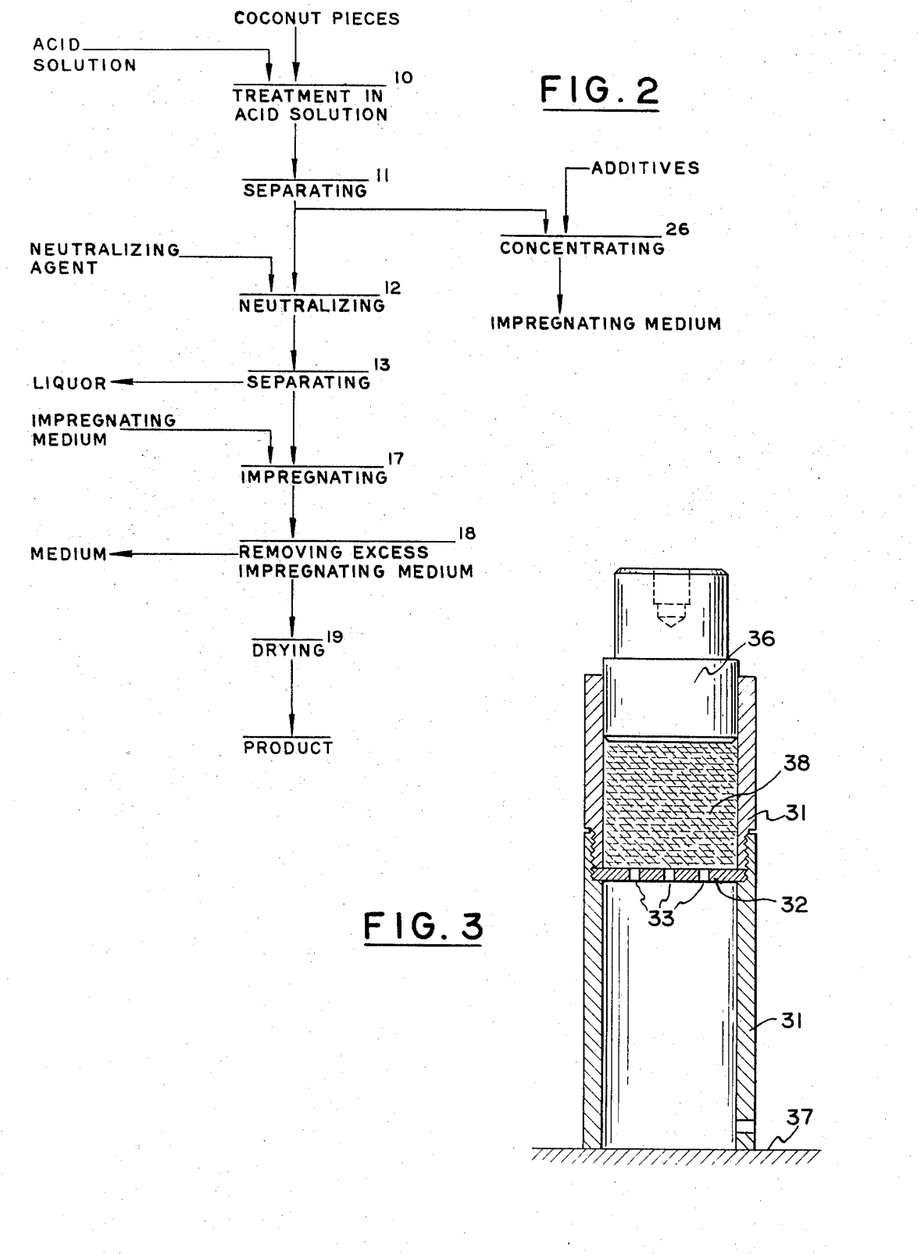
FIG. 2 is a flow sheet illustrating a modified procedure for carrying out the invention.
FIG. 3 is a device used for testing the extrudibility of the tenderized coconut.

As described in connection with FIG. 1, impregnating material is made up separately and supplied to the process. As indicated in FIG. 2, the texturizing syrup is prepared by making use of ingredients contained in the liquor removed in the separating step 11. After neutralizing acid by addition of a suitable alkali the liquor from step 11 is shown being concentrated in step 26 and as indicated may be mixed with one or more additives to make up the impregnating material. As previously mentioned, during the acid treatment step 10 some of the natural protein of the coconut meat is removed and is contained in the liquor removed in step 11. Likewise this liquor contains a substantial portion of the natural coconut fat. By supplementing the ingredients of the liquor with sugar and removing some of the water content, a material containing sugar, protein and fat in usable proportions can be prepared for step 17. In some instances it may be desirable to use only part of the liquor removed in step 11, or in other instances all of this liquor may be retained in the material. In addition to sugar some further protein (e.g., sodium caseinate) may be added to supplement the natural protein present.

As previously mentioned the impregnating medium serves to provide desired physical characteristics for the final product. The sugar content also serves as a sweetener. If desired a synthetic sweetening agent can be introduced such as sorbitol, cyclamate or saccharine. Also additional seasoning and flavoring materials can be added to the impregnating syrup, as for example, almond flavoring. In addition final dried products can be coated with various edible materials, such as chocolate or confections, fats and natural or synthetic waxes, e.g., Myvacet, to which may be added various spices, condiments and flavors. The flavor of the final products can also be modified by roasting.

In the foregoing the impregnating step is carried out at atmospheric pressure. Penetration can be aided by applying a partial vacuum for a short time followed by release of the vacuum and return to atmospheric pressure.

With respect to the tenderizing effect obtained by the acid treatment in step 10, microscopic analyses have been made and photomicrographs taken of the coconut meat before and after such treatment. Photomicrographs of fresh coconut meat before any treatment reveal an elongated uniform cell structure, with the cells being aligned and parallel in compact rows in cell bundles. These cells normally contain fat and water, although a small amount of fat may be exterior of the cells. As previously mentioned, the cell structures are held together by cementitious material which has a substantial protein content. When fresh coconut meat is boiled in water for 15 minutes at 212°F., the cell structure remains the same and the cementitious material is not materially altered. When fresh coconut meat is boiled in 0.5 percent hydrochloric acid solution for a period of 30 minutes, photomicrographs show what appears to be disrupted cells with a portion of the fat released. The cells no longer appear to have a close compact relationship. Also there appears to be some reorientation of the cells with respect to their relative positioning to form a loose mass whereby material can be absorbed into and about the disrupted cells. The disrupted appearance of the cells on microscopic examination is attributed at least in part to dissolution of the cementitious material which bonds the cells and cell tissue together.

To summarize what has been determined by photomicrographs and other microscopic observations, the normal cell structure of both fresh and desiccated coconut consists of elongated cells that are relatively uniform and aligned in compact rows in cell bundles. In fresh coconut these cells are filled with fat and water, and in desiccated coconut the cells retain fat with only a small amount of moisture. A small amount of free fat, that is, fat exterior of the cells, appears to be present in fresh coconut meat. The cells resist disruption or structural modification when boiled in water. When the material is passed through a mechanical disintegrator, the cells are chopped into cell portions or shorter length, but the inherent structure of the cells is not materially altered. Acid treatment according to the present invention drastically alters the cell structure by dissolving a substantial part of the cementitious material and by imparting the effect of disrupted cells. The amount of such alteration depends upon the pH of the solution, and the time period and the temperature of the treatment. In addition the cells appear to be reoriented relative to each other to provide a loose absorbent mass. Acid treatment with modification of the cells also serves to release a part of the fat content.

Aside from microscopic analysis of samples referred to above it has been confirmed by tests that the acid treatment not only tenderizes the coconut meat but also makes the coconut pieces relatively absorbent of materials like sugar syrup. Thus in one test fresh coconut meat was boiled in 0.5 percent hydrochloric acid solution for a period of 15 minutes, and then the moist tenderized meat removed, excess liquid drained away, and the pieces immersed in a syrup of corn sugar at a temperature of about 215°F. The syrup contained a dye for the purpose of determining the extent of penetration into the tenderized meat. After being immersed in the hot sugar syrup for a period of 40 minutes, the pieces were removed and after cooling they were subjected to microscopic examination. It was observed that the colored syrup had been absorbed completely into and around the cells of the meat. In contrast, a control sample made by immersing pieces of fresh coconut meat in boiling water for a period of 15 minutes, followed by immersion in the same colored sugar syrup at a temperature of 215°F. for a period of 40 minutes, revealed on microscopic examination that the colored syrup was only superficially and irregularly absorbed on the surfaces of the cell bundles.

It is evident from the foregoing that the acid treatment of the present process changes the character of the cell structure and the cell bundles in a manner which cannot be obtained by boiling in water or by mechanical disintegration. The cells are individually modified with some reorientation in a random fashion to produce a loose absorbent mass.

As a quantitative test of the tenderizing effect of the process on fresh coconut pieces, tests were made to determine their extrudibility. The test cell of the equipment used for this purpose is shown in part in FIG. 3. It consists of a stainless steel tube 31 having an internal diameter of 1 inch and made in two sections coupled together and supporting the perforated disc 32. The disc was provided with 9 holes 33 spaced apart ¼ inch between centers and each having a diameter of 0.045 inch. Above the disc 32 the tube was fitted with a piston or plunger 36 having an external diamter slightly less than the internal diameter of the tube. The plug was made whereby it could be coupled to the force supplying cross arm of a laboratory recording machine (Instron), the arrangement being such that with the tube 31 resting upon a supporting surface 37, plug 36 could be moved downwardly at a predetermined speed against the sample 38. Assuming that the test is started with the upper portion of the tube 31 above the disc 32 completely packed with the sample, as the plunger 36 moves downwardly the sample is first gradually compressed and eventually the force is sufficient to cause the sample to be extruded through the holes 33. Eventually the plug reaches a position near the disc 32 and substantially all of the sample has been extruded. At this point the downward travel of the plunger is arrested. By recording the forces at various points along the travel of the plunger 36 it is possible to make a comparison between the extrudibility of various samples.

For the purpose of a control sample, pieces of fresh coconut were prepared having the dimensions and shape of the fresh coconut dices referred to in Example 1. These pieces were boiled in water for 15 minutes, after which free water was removed. Additional samples were prepared in the manner described in Example 1, making use of acid treatment. When tested for extrudibility the samples prepared by boiling in water required forces ranging from 320 to 800 pounds to complete extrusion, and this was accompanied by a substantial amount of oscillation of the recorder pen caused by wide variations in extrusion force. In general this showed that high average forces were required for extrusion, that the extrusion forces varied widely, and that there was a great difference between minimum and maximum extrusion forces.

When the samples prepared by acid treatment in accordance with Example 1 were tested, the minimum force for extrusion was about 100 pounds, and the maximum force about 200 pounds. This variation in force between minimum and maximum limits was considerably less than that experienced in connection with the samples boiled in water. Also the average extrusion force and the force excursions for the acid treated sample were substantially less. It was also found that with the acid treated samples, continuous string-like extrusions were produced, in contrast with samples which had simply been boiled in water. The latter samples gave extrusions that were disconnected and tended to break apart. Stated another way, the acid treated samples gave continuous extrusions of a compact noodle-like character, whereas the samples produced by boiling in water extruded in an irregular manner with the particles of the material of the extrusions being loosely bonded together by the extrusion forces.

In general, the present invention greatly extends the field of usage of coconut in the food industry. The final products can be made in pieces of substantial thickness compared to commercial desiccated coconut forms, with good palatability and good processing properties. When the pieces are in the form of strings they are more readily severed than commercial desiccated coconut strings of comparable thickness. The products of the present invention are also amenable to impregnation with various materials to produce pieces of a texture differing from that normally associated with coconut meat, as for example a texture that is normally associated with nuts. More specifically, the process can be used to produce products in shred or string form which have eating properties differing from prior commercial forms of comparable size, and which can be used to advantage in cake or cooky doughs or confection mixes. Such doughs and mixes may be readily subdivided in a wire cut depositor because of the tenderized character of the shreds or strings. Conventional coconut forms (e.g., shreds, slices, ribbons, strings) can be made thicker but with desirable tenderness and good eating properties. The thicker forms can be made with an inner untreated core, thus providing products having novel properties with reference to flavor, mouth feel, and general usefulness in the food industry. All of the foregoing forms can be impregnated to provide a variety of products suitable for consumer or industrial uses.

Examples of the invention are as follows:

EXAMPLE 1

The source material was fresh coconut meat. It was first peeled and then sliced into particles about ⅜ inch square and about ⅛ inch long. The meat contained essentially all of the natural oil content of the fresh meat. Three hundred pounds of water was acidified to provide a 1.0 percent hydrochloric acid solution (the acid added as a 37 percent HCl solution), having a hydrogen ion concentration of pH 0.85. The acid solution was heated to boiling point (212°F.) in a steam-jacketed agitated kettle. To the 300 pounds of boiling solution there was added 300 pounds of the fresh coconut pieces. Initially boiling ceased, but with the continuous application of heat, it returned to boiling temperature in about 2 minutes. Boiling was then continued for a period of about 40 minutes after which the supply of heat was discontinued. Free liquid was then removed from the moist pieces by decanting and draining and this liquid was replaced by a substantially equal quantity of bicarbonate of soda solution at about 80°F. This previously prepared solution was prepared by dissolving bicarbonate of soda in water in the proportions of 2 pounds of the soda to 300 pounds of water. The batch was then transferred to a holding tank where it was held for a period of about 8 hours to effect substantially complete neutralization. At this point the free liquid, which was at about pH 5.5, was removed and centrifuged to remove about 7 pounds of fat. It was observed that the tenderizing action of the acid was effectively terminated by adding the sodium bicarbonate solution, which neutralized acidity and caused a rapid reduction in the temperature of the meat.

The resulting moist pieces of coconut meat were tender in structure with a texture analogous to moist pecan nut meat. The residual coconut flavor was relatively mild compared to fresh coconut meat. When tested for extrudibility by the test hereinafter described, the pieces were found to be readily extrudible at forces ranging from 150 to 200 pounds.

Pieces produced as in Example 1 can be used in various food products without losing their physical identity. For example they can be introduced into food products during canning as for so-called fruit cocktail.

EXAMPLE 2

The procedure was substantially the same as in Example 1. However, instead of continuing the acid treatment for a period of 40 minutes, the time was reduced approximately one-half, namely to about 20 minutes. It was observed that the coconut pieces after such treatment and after neutralization were not tenderized to the same degree as the pieces produced in Example 1. More specifically, the effect was to tenderize the outer regions of the pieces, leaving the central cores of the pieces relatively firm. However, the product was noticably less tough to eat than fresh coconut. One benefit which distinguished the product from that produced by Example 1 was that the central core retained more natural coconut flavor in the final product.

A comparable type product was made by increasing the acid concentration to 2 percent and reducing the holding time in the acid solution to about 1 to 2 minutes, which was sufficient to effect some surface acid penetration. The coconut pieces were then removed from the solution and held in a closed container for a period of from 40 to 60 minutes at a product temperature of about 180°F., before further neutralizing.

EXAMPLE 3

The procedure was generally the same as in Example 1. However, before acid treatment, the fresh coconut was shredded into strings measured about ½ to 3 inches in length and 3/32 inch thick. The time of the acid treatment was reduced to 11 minutes. This served to tenderize the outer layer portions of each strand, leaving an inner fine central core unimpaired and of essentially its normal structure. This core gave some additional strength or structure to the strings. However, the processed strings were more tender than the original string coconut meat, and the outer surface regions of the strings were receptive to impregnation in subsequent processing.

The foregoing Example 3 demonstrated certain desirable attributes of the invention, namely that it makes possible coconut derived products having eating properties differing from prior commercial products, and such new products can be made in forms thicker than the prior commercial forms that, as previously explained, are subject to thickness limitations imposed by the natural toughness of the untreated coconut meat. For example, prior commercial desiccated forms of coconut (shreds, strings, ribbons, flakes or slices) ranging in thickness from 0.015 to 0.15 inch. So-called toasted ribbons may be slightly thicker. By using the present process, the thickness of these forms can be greatly increased, as for example from 0.15 to 0.3 inch. In addition, the products can be made in other physical forms, such as dices or forms simulating natural nut pieces.

EXAMPLE 4

A quantity of the moist processed coconut pieces produced in Example 1 was dried to a moisture content of about 2 percent in a conventional tray dryer, over a drying period of about 16 hours, using a drying air temperature of about 160°F. Compared to fresh coconut which had been dried in a similar manner but without the processing, the pieces were more tender and crunchier. It was found that such dried pieces could be incorporated in various bread, cake and cooky doughs and batters, and that when so incorporated in the uncooked moist dough or batter, the pieces re-hydrated, and provided tender moist pieces in the finished baked products.

The dried pieces as produced by Example 4 were also enrobed with commercial confection chocolate, both as individual pieces, in clusters, and in the form of a bar. Such confection products had good eating properties, with desirable crunchiness comparable to nuts and good mouth feel.

EXAMPLE 5

Moist coconut pieces processed as in Example 1 were frozen and then stored as a frozen product. After storage for several weeks, the pieces upon thawing showed no deterioration, and were as usable as the pieces before freezing. Such pieces could be introduced into various food products with or without thawing.

EXAMPLE 6

Ten pounds of tenderized coconut pieces produced as in Example 1 were processed as follows. Twenty pounds of corn syrup (43 D.E.) was heated in a scraper agitated steam heated kettle to boiling point. The concentration of the syrup was about 80 Brix. The 10 pounds of coconut pieces were introduced into the boiling syrup, and with continued application of heat boiling recommenced in about two minutes. After continuing boiling for about seven minutes, the pieces were removed from the hot syrup and rinsed with boiling water to remove surface syrup. It was noted that about 20 to 25 percent of the initial moisture content had been removed from the coconut during this impregnating step. The coconut pieces were then dried in a tray dryer using an initial air temperature of about 160°F., to obtain a final moisture content of below 2 percent. The resulting pieces were non-adherent, or in other words, the product was free-flowing in bulk. It was well suited for use in confection and various bakery products, having reference particularly to bread, cake and cookies. When such baked products were stored it was found that the coconut was not subject to molding and the pieces as a component of the baked product retained their identity, and could be neatly sliced with the baked dough without their pulling out.

When incorporated in a cooky or confection, the pieces produced in Example 6 were crunchy with good nut-like mouth feel. When incorporated in cooky dough it was found that the dough mix could be deposited with a depositor of the wire cutter type, and that in cutting the wire severed any intervening pieces without unduly distorting the cooky forms. Likewise, when the pieces were introduced into sugar-based confection fillers intended to be enrobed, as in box chocolates and candy bars, it was found that such fillers could be deposited with a similar wire cutting mechanism, and that the nut-like pieces could be severed on surfaces facially coincident with the severance surfaces of the confection.

EXAMPLE 7

The procedure was generally the same as in Example 6. However, instead of drying the sugar impregnated pieces, they were frozen by use of the well-known individual quick freeze technique such as is commonly used in the freezing of vegetables. The product was then stored for a period of 90 days in frozen condition, after which it was found that the pieces had not suffered any deterioration.

Pieces produced as in Example 7 can be introduced into various cake doughs, with or without preliminary thawing. During baking of the cake mix, and pieces that contact the baking pan do not cause sticking. Also, such pieces retain their physical identity in the final baked product, and they remain stable for the duration of bakery products like layer cakes. In addition the pieces remain distributed in the cake dough without sinking to the bottom of the cake before and during baking. Here again the pieces slice with normal, or mechanical, cutting, without pulling out of the baked dough, and they impart their characteristic eating properties and mouth feel in contrast with the cake crumb structure.

EXAMPLE 8

Ten pounds of tenderized, moist coconut pieces produced as in Example 1 were processed as follows. Ten pounds of coconut fat having a melting point of 98°F. was introduced into a vessel and melted by heating to 200°F. The batch of moist coconut pieces was introduced into the molten fat, and the pieces were kept submerged in the fat for a period of 12 hours. The temperature during this time was maintained at about 140°F. Free molten fat, together with some moisture and solubles extracted from the pieces, was then drained off, and the pieces dried in a conventional tray dryer. Drying commenced with an air temperature of 180°F. for twelve hours, and then the air temperature was decreased to 160°F. for the remainder of the drying cycle. At the beginning of the drying cycle some fat was noticable on the surfaces of the pieces. When pieces were impregnated with fat and then subjected to drying, added fat content does not retard shrinkage. In conjunction with shrinkage some fat is expressed from the pieces during the drying cycle and remains on the surface or drips off of the pieces as they are gathered and removed from the dryer trays. On cooling free fat on the surfaces of the pieces becomes firm and has a smooth finish. After cooling the pieces were free-flowing in bulk. The fat content of these pieces was of the order of 60 percent, whereas the dried pieces produced in Example 4 had a fat content of about 50 percent. The increased fat content appeared to enhance the nut-like eating properties of the finished product in that the pieces were crunchy and crisp. However, residues still tended to compact between the teth in undesirable fashion when eaten out-of-hand. The latter was not discernable when the pieces were eaten with other food materials (e.g., with the pieces being in a product having other food ingredients).

EXAMPLE 9

Ten pounds of tenderized, moist coconut pieces produced as in Example 1 were processed as follows. One part by weight of soluble milk protein (sodium caseinate) was dispersed in ten parts of water. After heating to about 130°F., the ten pounds of tenderized coconut pieces was added, and heating was continued for 15 minutes. The impregnated pieces were then removed, free liquid removed and the pieces lightly rinsed with boiling water. The pieces were then dried in an atmospheric tray dryer commencing with an air temperature of 190°F. and finishing 24 hours later with an air temperature of 160°F. The dried product had a moisture content of less than 2 percent. It was observed that the finished dried pieces had noticable crunchiness compared to the products produced in example 4. Also it was noted that the protein had penetrated only the outer surface layers of the pieces, and that impregnation was not complete. The total protein content of the final product, including the residual natural protein and the added protein, was of the order of 7 percent, which is comparable to the natural protein content of coconut meat (dry solids basis) and of natural nuts such as almonds and pecans.

EXAMPLE 10

Ten pounds of moist tenderized coconut pieces produced as in Example 1 were processed as follows. An impregnating syrup was prepared consisting of one-half corn syrup (43 D.E.) and one-half hydrolized cereal solids (Morex 10 D.E.) with sufficient water to provide a concentration of 50 Brix. To this was added a paste consisting of one part of the protein used in Example 9 and 5 pounds of water. After blending, the mass was heated to 180°F., and the tenderized coconut pieces were added. Impregnation was continued for about 2 hours with mild agitation at about 180°F. Free liquid was then drained from the pieces, and the pieces rinsed with boiling water. The pieces were then dried to a moisture content of less than 5 percent in a shelf dryer, in the same manner as described in Example 9.

When products as produced in the foregoing Example 10 were used in baking, the results were substantially the same as the products produced in Example 9. There was some improvement in the product over that of Example 9 when eaten out of hand, having reference particularly to crunchiness and general palatability.

EXAMPLE 11

Ten pounds of the moist tenderized coconut pieces produced as in Example 1 were processed as follows.

A mixture was prepared comprising 30 percent corn syrup (43 D.E.), 30 percent hydrolized cereal solids (Morex — 10 D.E.) and 40 percent coconut fat having a melting point of about 130°F. To this mixture there was added about 1 percent of lecithin, which served as an emulsifier. Sufficient water was added to the mix to provide a concentration of about 70 Brix, after heating and mixing to disperse the ingredients. The moist coconut pieces were then added and the entire batch heated to 200°F. and held at that temperature for about 2 hours. The impregnated pieces were then separated out on a screen, and rinsed with boiling water. They were then dried in an atmospheric shelf dryer over a drying cycle of 24 hours, starting with an air temperature of 180°F., and finishing at an air temperature of 160°F. The final product had a moisture content below 5 percent.

The final product of Example 11 had superior out-of-hand eating properties when compared with the products of Example 8. Some crunchiness was present and the product was excellent when incorporated in various bakery and confectionary products, particularly in that it possessed properties that compared favorably with natural nut meats.

EXAMPLE 12

The purpose of this Example was to produce a product from coconut meat having properties similar to certain natural nuts. The formation of the impregnating syrup was as follows.

One hundred pounds sugar syrup, containing equal amounts of corn syrup (43 D.E.) and hydrolized cereal solids (Morex — 10 D.E.) was mixed with sufficient water to provide a concentration of 70 Brix.

One hundred pounds of fat emulsion was prepared containing 50 pounds coconut fat (melting point 130°F.) and 50 pounds water, plus 1 percent lecithin. These ingredients were homogenized at an elevated temperature (200°F).

One hundred pounds protein solution was prepared by dispersing a protein (sodium caseinate) in water, in the proportions by weight of one-third protein and two-thirds water.

The above ingredients were introduced into a scraper agitated kettle and heated to about 200°F. to form a homogeneous material. To this material there was added an equal weight of moist tenderized coconut pieces prepared as in Example 1. The pieces were added gradually over a 3 minute period with sufficient heat being supplied to maintain the temperature of about 200°F. Impregnation was continued over a period of 4 hours, during which time the mass was moderately agitated. The pieces were then separated from the liquid, and rinsed with boiling water. Thereafter the pieces were air dried starting with an air drying temperature of 180°F. for 8 hours and finishing with a temperature of 160°F. for a total drying period of 24 hours.

The product produced by the foregoing Example 12 had excellent out-of-hand eating properties. It was observed that crispness was imparted by the protein, and some oiliness was imparted by the coconut fat added to the product. In general the product was quite similar to natural almonds, both with respect to eating properties and analysis.

EXAMPLE 13

The procedure was generally the same as in Example 11. However, the formulation of the impregnating material was as follows.

| | |
|---|---|
| Sweetened condensed milk (Eagle brand, containing 30% water, 40% sugar and 30% milk solids, including milk protein) | 0.33 lbs. |
| Corn syrup | 0.33 |
| Pure beeswax | 0.016 |
| Hard fat flakes | 0.148 |
| Salt (NaCl) | 0.01 |
| Water sufficient to produce a starting liquid of 50 Brix | |

The fat at 160°F. was mixed with the other ingredients in a Waring blender.

Impregnation and drying of the pieces was carried out substantially as described in Example 12. It was noted that the final product was crisp and crunchy, and when eaten there was no unacceptable pulp residue compacted between the teeth. Inspection of sections revealed that the syrup had penetrated only the outer surface layers of the pieces, and that upon drying such limited impregnation formed a relatively dense crisp outer shell structure. The shell inhibited overall size shrinkage of the pieces during drying.

The impregnating material in this instance contained sugar, dispersed milk protein and fat. However, the finished product was more like a crisp, crunchy nut-like confection when eaten out-of-hand. Also, the product was usable in bakery products to provide confection-like pieces in cakes, cookies and the like.

EXAMPLE 14

The procedure was substantially the same as in Example 13, using the same impregnating material. The material was introduced into a container into which the moist acid treated pieces were added. The ratio between the pieces added and the impregnating syrup was of the order of 1 pound of pieces to 2 pounds of the syrup. This batch and the container were placed in a vacuum oven and subjected to sustained heating at about 150°F. A vacuum corresponding to 28 inches mercury column was applied and thereafter released. This was repeated five times. The pan was then removed from the oven, free liquid removed from the pieces by draining, and the pieces then dried in a circulating air dryer at atmospheric pressure, using drying air at about 160°F. The drying cycle required from 16 to 20 hours.

The product resulting from the foregoing example had an excellent nutty structure, with a clean fracture. When eaten it had a crunchy texture and pulp fiber did not adhere to the teeth. Tests showed that as compared with tenderized coconut pieces which were dried without being impregnated, the solids pickup of the final product was about 21.5 percent. This pickup represented solids gained from the impregnating material. Inspection of sections of the pieces indicated that the impregnating material had penetrated into the centers of the pieces.

In the foregoing example the impregnating material included sugar, milk protein and hard fat.

I claim:

1. In a process for the treatment of pieces of coconut meat characterized by aligned rod-like cells arranged in cell bundles, immersing the pieces of coconut meat in a water solution of a physiologically acceptable acid at an elevated temperature and at a pH and for a period of time sufficient to effect disruption of the cells and loosening of the cells with respect to each other thereby tenderizing and promoting absorptivity of the pieces, causing residual acid of the pieces to be neutralized and free liquor of the batch to be removed to provide edible moist tenderized coconut pieces, and then contacting the moist tenderized coconut pieces with a liquid impregnating material having edible constituents whereby the pieces are impregnated by the liquid material.

2. A process as in claim 1 in which the moist impregnated coconut pieces are subjected to refrigeration or freezing to preserve the same.

3. A process as in claim 1 in which excess impregnating medium is removed from the pieces after impregnating the same.

4. A process as in claim 1 in which the impregnated pieces of tenderized coconut are then subjected to drying to produce a dry product.

5. A process as in claim 1 in which the moist impregnated pieces are subjected to refrigeration or freezing to preserve the same.

6. A process as in claim 1 in which the impregating liquid material contains sugar syrup.

7. A process as in claim 1 in which the impregnating liquid material contains a protein.

8. A process as in claim 1 in which the impregnating liquid material contains a fat.

9. A process as in claim 1 in which the impregnating liquid material contains sugar syrup and protein.

10. A process as in claim 1 in which the impregnating liquid material contains sugar syrup, protein and fat.

11. A process as in claim 1 in which at least part of the impregnating medium consists of hydrolyzed cereal solids having a dextrin equivalency of about 10 to 30.

12. A process as in claim 1 in which the impregnating step is terminated to limit impregnation primarily to the outer surface layers of the pieces.

13. A process as in claim 1 wherein the pieces of meat being processed comprise only the outer and firmer 75 percent of the meat as it exists in the natural coconut shells.

14. A process for the manufacture of food products from pieces of coconut meat characterized by aligned rod-like cells arranged in cell bundles, comprising treating the pieces of coconut meat in an acid solution at a pH and for a sufficient period of time to effect substantial disruption of coconut cells and loosening of the cells with respect to each other, thereby tenderizing the meat and promoting absorptivity, neutralizing residual acid of the pieces, impregnating the resulting moist pieces with a syrup containing hydrolyzed cereal solids of low dextrin equivalency, removing excess syrup from the surfaces of the pieces, and then subjecting the pieces to drying to form a dry nut-like product.

15. A process as in claim 14 in which the impregnation of the tenderized coconut pieces is mainly in the outer surface layers of the same.

16. A process as in claim 8 in which the impregnating material also includes an edible wax.

17. A process as in claim 10 in which the impregnating material includes an edible wax.

18. The product produced by the process of claim 1.
19. The product produced by the process of claim 4.
20. The product produced by the process of claim 6.
21. The product produced by the process of claim 7.
22. The product produced by the process of claim 8.
23. The product produced by the process of claim 9.
24. The product produced by the process of claim 10.
25. The product produced by the process of claim 11.
26. The product produced by the process of claim 12.

* * * * *